(12) United States Patent
Driver et al.

(10) Patent No.: US 8,083,975 B2
(45) Date of Patent: Dec. 27, 2011

(54) EXHAUST AND/OR CONDENSATE PORT FOR CURED IN PLACE LINERS AND INSTALLATION METHODS AND APPARATUS

(75) Inventors: Paul L. Driver, St. Peters, MO (US); Joseph M. Coyne, St. Charles, MO (US); Franklin T. Driver, St. Charles, MO (US); Richard P. Baxter, St. Louis, MO (US)

(73) Assignee: INA Acquisition Corp., Wilmington, DE (US)

( * ) Notice: Subject to any disclaimer, the term of this patent is extended or adjusted under 35 U.S.C. 154(b) by 1397 days.

(21) Appl. No.: 11/350,669

(22) Filed: Feb. 8, 2006

(65) Prior Publication Data

US 2007/0001330 A1    Jan. 4, 2007

Related U.S. Application Data

(60) Provisional application No. 60/651,698, filed on Feb. 9, 2005.

(51) Int. Cl.
*B29C 73/00* (2006.01)
(52) U.S. Cl. .................................... 264/36.17
(58) Field of Classification Search .............. 264/36.17, 264/270; 138/98; 405/150.1
See application file for complete search history.

(56) References Cited

U.S. PATENT DOCUMENTS

| | | | |
|---|---|---|---|
| 5,737,822 A | 4/1998 | Driver et al. | |
| 2003/0192610 A1* | 10/2003 | Driver | 138/98 |
| 2003/0209823 A1* | 11/2003 | Waring et al. | 264/36.17 |
| 2004/0149341 A1 | 8/2004 | Driver | |

FOREIGN PATENT DOCUMENTS

| | | |
|---|---|---|
| EP | 0290184 A1 | 11/1988 |
| GB | 2335473 A | 9/1999 |
| JP | 57178828 A | 11/1982 |
| WO | WO 0198061 A | 12/2001 |
| WO | WO 2007022232 | 2/2007 |

OTHER PUBLICATIONS

Annex to the Communication in counterpart EP1846221, Jun. 10, 2009.*
International Search Report for PCT/2006/004508.

* cited by examiner

*Primary Examiner* — Christina Johnson
*Assistant Examiner* — Larry Thrower
(74) *Attorney, Agent, or Firm* — Senniger Powers LLP

(57) ABSTRACT

A process for porting air inflated flexible resin impregnated cured in place liner by pulling without loss of pressure is provided. A selectively openable bulkhead fitting is installed at the pull-in end. The filling may be installed in the end of a pull-in liner; on a porting sleeve or secured to an inflated pulled in or inverted liner. A port is formed through the bulkhead fitting by cutting a hole through the valve assembly. A steam fitting with an exhaust hose is coupled to the bulkhead fitting while maintaining pressure in the inflation bladder. Steam for curing the resin is then introduced into the inversion apparatus to cure the resin and is exhausted through the exhaust hose.

9 Claims, 18 Drawing Sheets

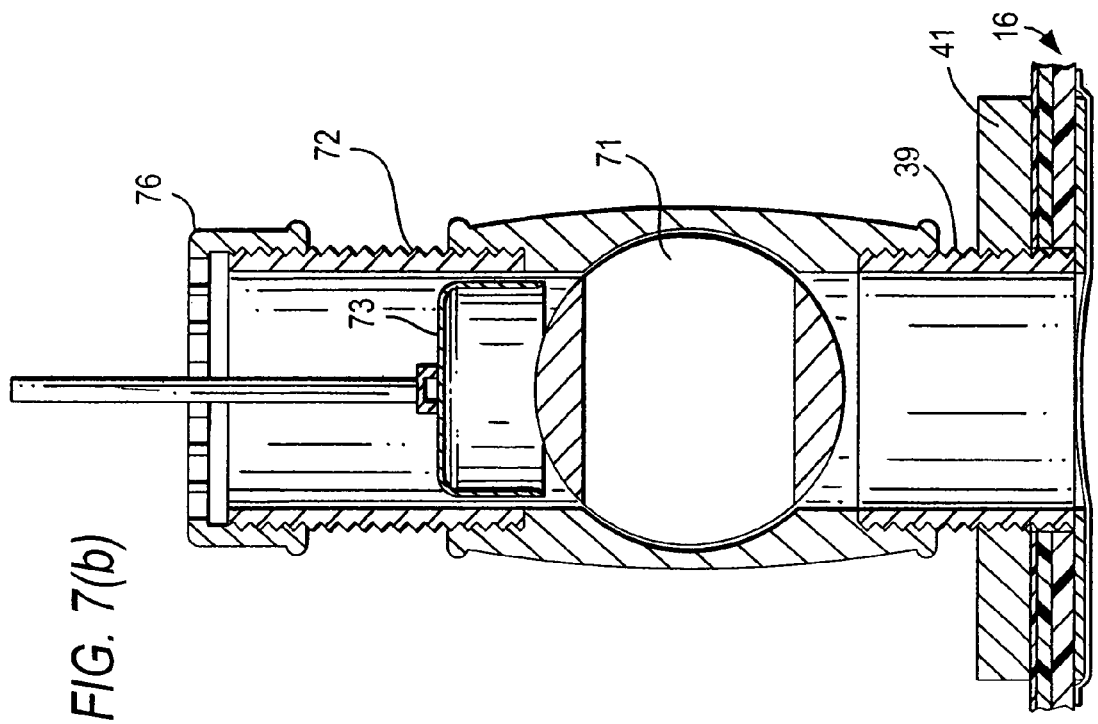
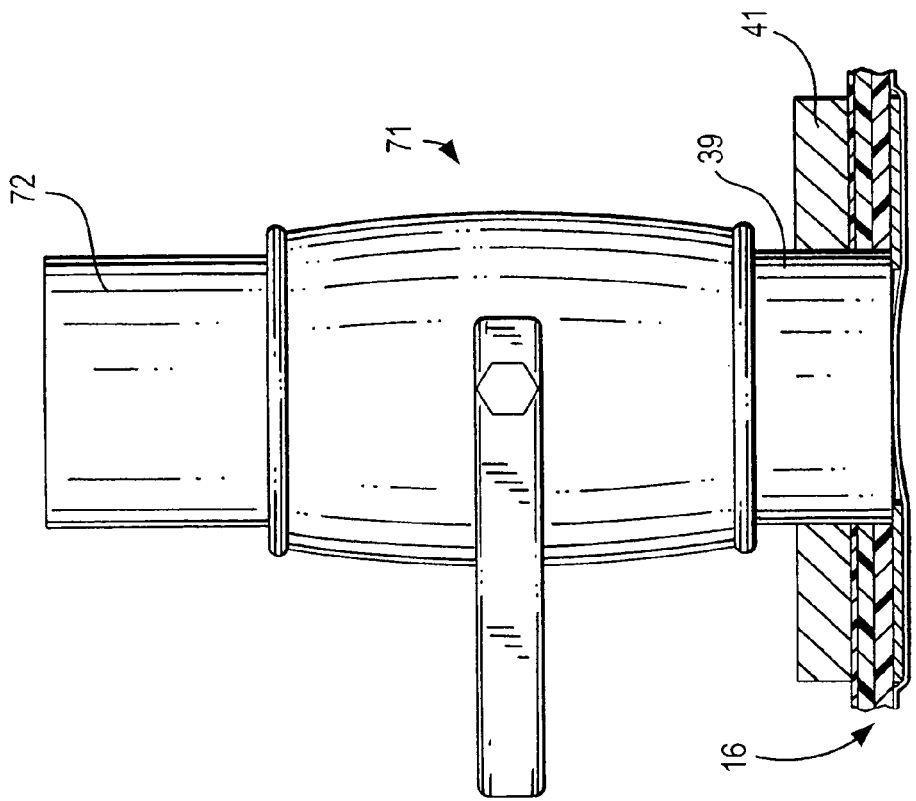

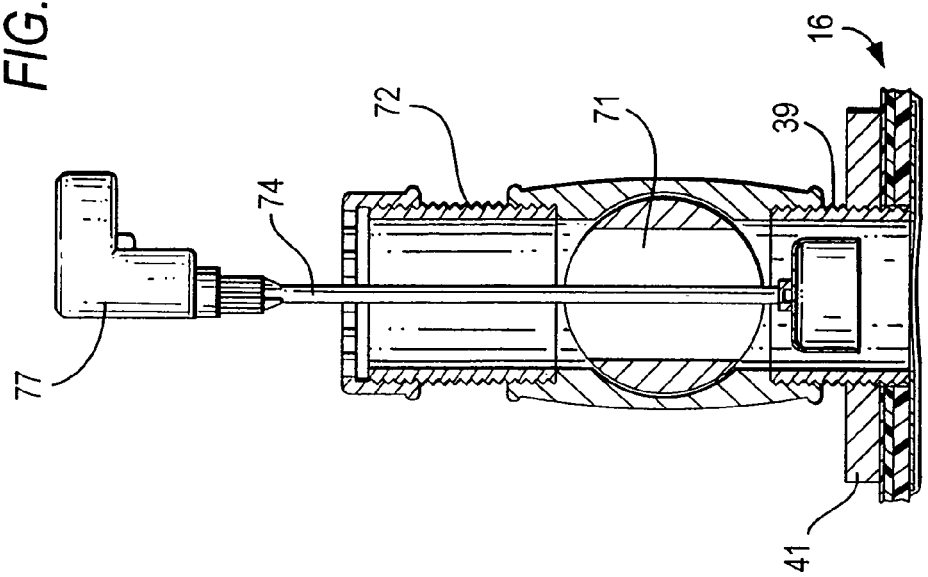
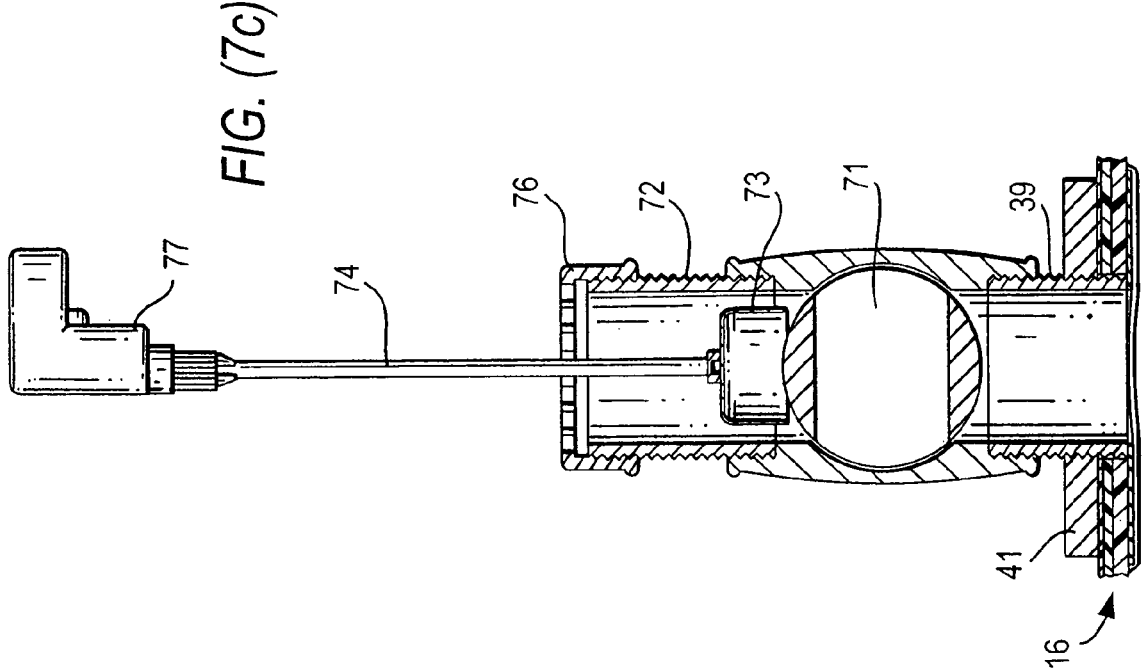

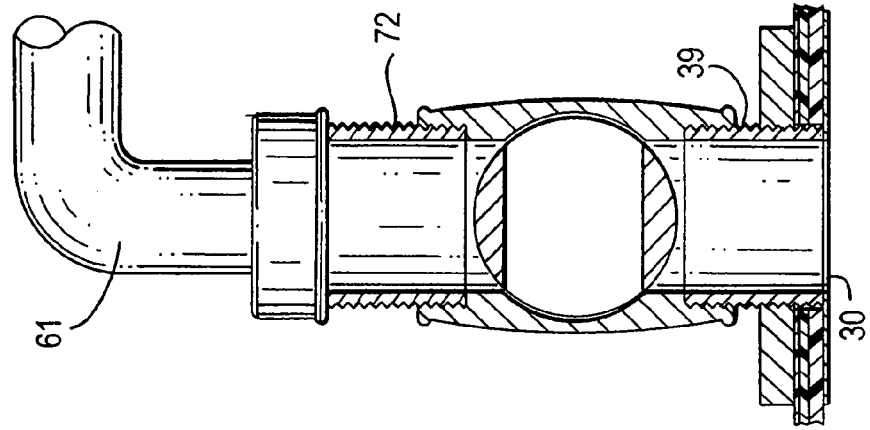
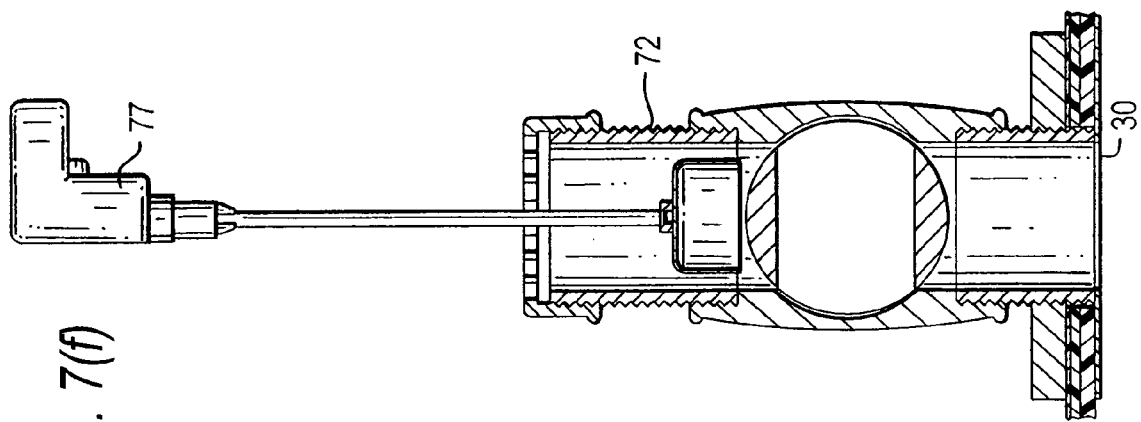
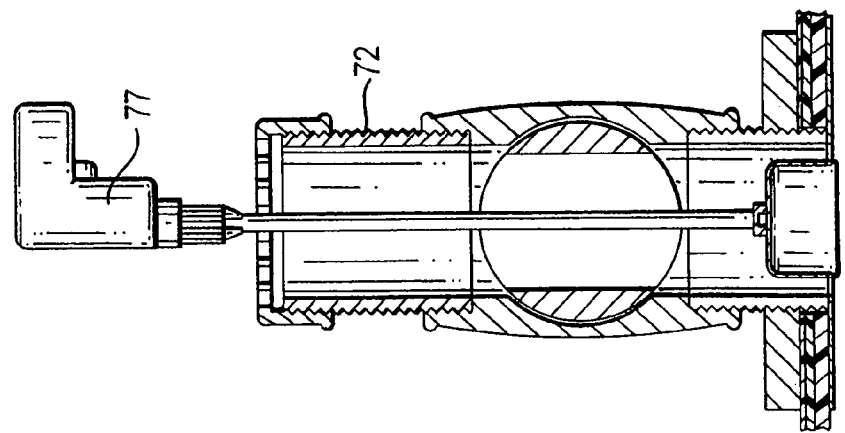

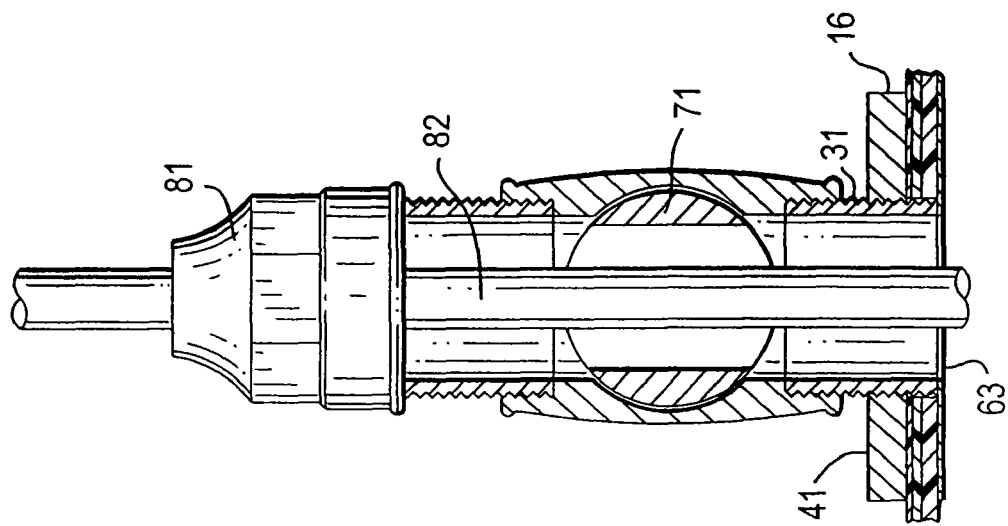
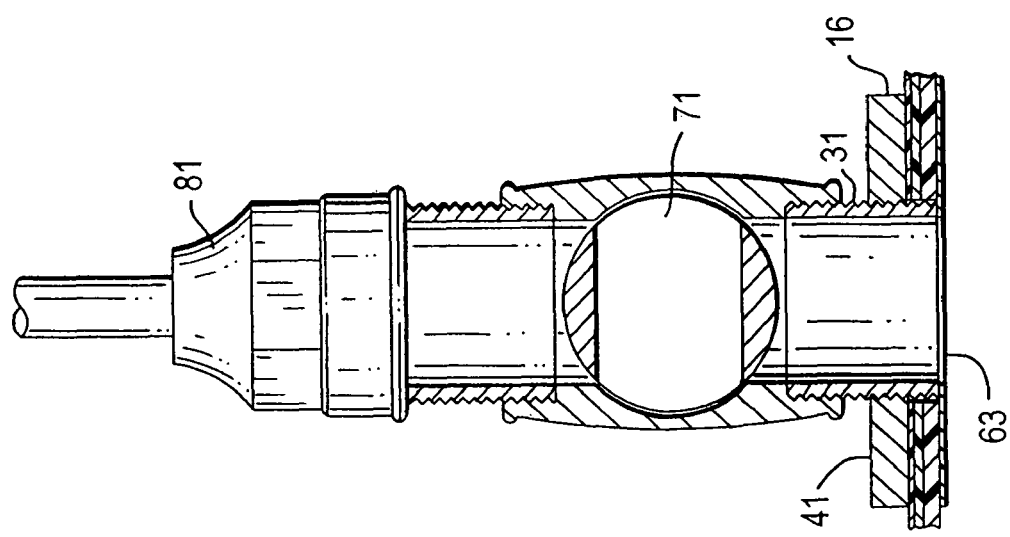

FIG. 14(a)
FIG. 14(b)
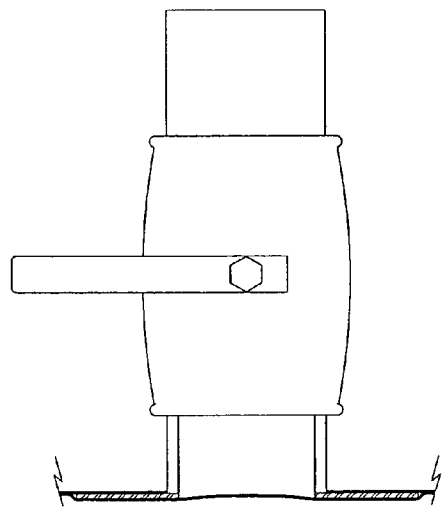
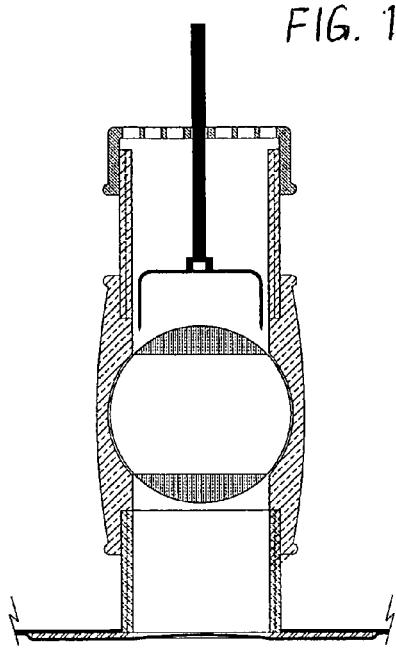
FIG. 14(c)
FIG. 14(d)
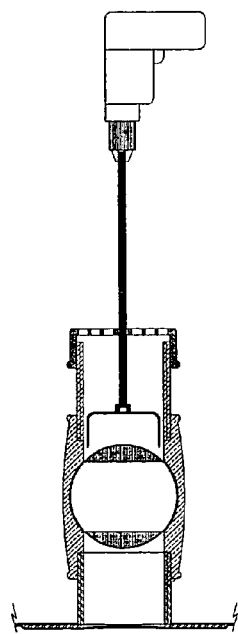
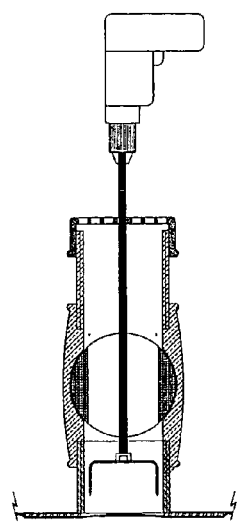

EXHAUST AND/OR CONDENSATE PORT FOR CURED IN PLACE LINERS AND INSTALLATION METHODS AND APPARATUS

CROSS REFERENCE TO RELATED APPLICATION

This application is based on and claims the benefit of provisional application Ser. No. 60/651,698, filed Feb. 9, 2005, the contents of which is incorporated by reference.

BACKGROUND OF THE INVENTION

This invention relates to installation of cured in place liners, and more particularly to a method for installation of an exhaust port in an inflated cured in place liner without loss of pressure to allow for continuous flow-through of steam to cure and to the apparatuses for practicing the method and methods on installation.

It is generally well known that conduits or pipelines, particularly underground pipes, such as sanitary sewer pipes, storm sewer pipes, water lines and gas lines that are employed for conducting fluids frequently require repair due to fluid leakage or deterioration. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakage is undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor, energy and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. This Process is described in U.S. Pat. Nos. 4,009,063, 4,064,211 and 4,135,958, all the contents of which are incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. Generally, the liner is installed utilizing an inversion process, as described in the later two identified Insituform patents. In the inversion process, radial pressure applied to the interior of an inverted liner presses it against and into engagement with the inner surface of the pipeline. However, the Insituform Process is also practiced by pulling a resin impregnated liner into the conduit by a rope or cable and using a separate fluid impermeable inflation bladder or tube that is inverted within the liner to cause the liner to cure against the inner wall of the existing pipeline. Such resin impregnated liners are generally referred to as "cured-in-place-pipes" or "CIPP liners" and the installation is referred to a CIPP installation.

The CIPP flexible tubular liners have an outer smooth layer of relatively flexible, substantially impermeable polymer coating the outside of the liner in its initial state. When inverted, this impermeable layer ends up on the inside of the liner after the liner is inverted during installation. As the flexible liner is installed in place within the pipeline, the liner is pressurized from within, preferably utilizing an inversion fluid, such as water or air to force the liner radially outwardly to engage and conform to the interior surface of the existing pipeline.

Typically, an inversion tower is erected at the installation site to provide the needed pressure head to invert the liner or a bladder. Alternately, an inversion unit as shown and described in U.S. Pat. Nos. 5,154,936, 5,167,901 (RE 35,944) and No. 5,597,353, the contents of which are incorporated herein by reference. Cure may be initiated by introduction of hot water into the inverted liner through a recirculation hose attached to the end of the inverting liner. Inversion water is recirculated through a heat source such as a boiler or heat exchanger and returned to the inverted tube until cure of the tube is complete. The resin impregnated into the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When tubular cured in place liners are installed by the pull in and inflate method, the liner is impregnated with resin in the same manner as the inversion process and positioned within the existing pipeline in a collapsed state. A downtube, inflation pipe or conduit having an elbow at the lower end typically is positioned within an existing manhole or access point and an inverting bladder is passed through the downtube, opened up and cuffed back over the mouth of the horizontal portion of the elbow. The collapsed liner within the existing conduit is then positioned over and secured to the cuffed back end of the inflation bladder. An inverting fluid, such as water, is then fed into the downtube and the water pressure causes the inflation bladder to push out of the horizontal portion of the elbow and cause the collapsed liner to expand against the interior surface of the existing conduit. The inversion of the inflation bladder continues until the bladder reaches and extends into the down stream manhole or second access point. At this time the liner pressed against the interior surface of the existing conduit is allow to cure. Cure is initiated by introduction of hot water into the inflation bladder that is circulated to cause the resin in the impregnated liner to cure.

After the resin in the liner cures, the inflation bladder may be removed or left in place in the cured liner. If the inflation bladder is to be left in place, the bladder will generally be one that has a relatively thin resin impregnable layer on the inside of the impermeable outer layer. In this case, the impregnable layer after inversion will cause the bladder to adhere to the resin impregnated layer of the liner as is well known in the art. At this time, entry into the manhole or access point is required to open the liner to release the water used to inflate the bladder and to cut off the ends extending into the manholes. When the inflation bladder is to be removed, it may be removed by pulling at the evasion end on a holdback rope attached to the trailing end of the inflation bladder used to control the speed of the inversion. This is generally done after puncturing the bladder at the receiving end to release the water used to invert the bladder and initiate the resin cure. Finally, the downtube can then be removed and service can be reconnected through the lined pipeline. If intersecting service connections are present, they would be reopened prior to resumption of service through the lined pipeline.

In the existing water inversion process utilized by the Insituform Process, the liner is inverted using cold water. After the liner is fully inverted in the existing conduit, heated water is circulated through a lay flat tube connected to the inverting face of the liner. The hot water is circulated during the cure cycle. In medium and large diameter lines as the liner diameter increases the volume of water required for inversion increases dramatically. All the water used to inflate the liner—whether inverted or pulled-in-and-inflate—must be heated during the heating and cure cycle. In addition, once the cure is complete the cure water must be cooled either by addition of cold water or continued circulation until the cure water is at a temperature that may be released into the down stream conduit after the liner is cut at the end of the conduit.

The major disadvantage to the use of these apparatuses with water is the quantity and availability of the inverting water. Water must be heated typically from 55° F. to 180° F. in order to affect the cure, and then cooled by the addition of more water to 100° F. before being released to an acceptable disposal system.

This disadvantage may be overcome by using air in lieu of water to create the inverting force. Once the impregnated liner is fully inverted, it then can be cured with steam. Although water is necessary to produce steam, the quantity of water in the form of steam is only 5-10% of that required for water inversion, cure and cool down. This means that steam can be used for curing even if water is not readily available on site. This drastic reduction in the quantity of water is the result of the higher energy available from one pound of water in the form of steam versus one pound of heated water. One pound of steam condensing to one pound of water gives off approximately 1000 BTUs while one pound of water gives off only one BTU for each degree in temperature drop. This reduced water requirement plus virtual elimination of the heat up cycle greatly reduces cure cycle and installation time.

With this apparent advantage in using air inversion and steam cure why has the industry been slow to abandon water inversion and hot water cure?

When water is used to invert the resin-impregnated liner, the uninverted portion of the liner from the inverting nose to the inverting apparatus is buoyed up by a force equal to the quantity of water displaced by the liner. In the case of CIPP liners, this mean the effective weight of the liner is substantially reduced, as is the force necessary to pull the uninverted liner forward to the inverting nose. When air is used to create the inverting force, the uninverted liner lies on the bottom of the pipe and the air pressure acting on the inverting nose of the liner must pull the full weight of the liner forward.

Three forces must be over come to invert a CIPP liner no matter what is used to create the inverting energy. These forces are:

1. Force required to invert the liner (turn liner inside out). This force varies by liner thickness, material type and relation of liner thickness to diameter.

2. The force necessary to pull the liner from the inverting apparatus to the inversion nose.

3. The force necessary to pull the liner through the inverting apparatus.

Force number one (1) above is generally the same for both air and water inversions.

Force number two (2) varies greatly between air and water and can limit the length of air inversions. There is limit on how much pressure can be used to invert a liner without adversely affecting the quality of the installed CIPP liner and/or damaging to the existing conduit. Lubricant can be used for both water and air inversion to reduce the required pulling force.

Force number three (3) can vary based on the apparatus design. In most apparatus presently in use, the force required to pull the liner through the apparatus will increase when either or both forces one and two increase. This is caused by the fact that in order to increase available inversion energy, typical apparatus in use today restrict loss of pressurized fluid from the pressure chamber below the liner entry point into the apparatus and the cuff and banded end of the liner being inverted. This restriction is typically accomplished by increasing the air pressure in a pneumatic sphincter gland, or by using a gland that is energized by the inverting fluid. The movement inward in typical cases is restricted by the gland material and compression of the inverting CIPP liner. This in turn causes an increase on the friction between the inverting CIPP liner and gland.

In view of the apparent benefits of steam compared to hot water, the use of steam has been proposed in view of the energy it carries. The use of air to inflate an inflation bladder and flow-through steam has been disclosed in Insituform U.S. Pat. Nos. 6,708,728 and 6,679,293, the contents of which are incorporated herein by reference. The processes disclosed in these recently issued patents utilize pull in and inflate technology and are currently in use for small diameter liners. They provide advantages over water inversion for these size liners. Moreover, use of a receiving canister disclosed in these patents is not always suitable for medium and large diameter liners. Medium size liners are those between about 21 and 45 inches in diameter. Large diameters are those in excess of about 45 inches in diameter.

While the existing methods utilizing hot water to cure have various advantages noted above, the shortcomings tend to increase energy and labor costs as well as involving a significant use of water that may have styrene entrained due to the type of resins typically used. Accordingly, it is desirable to provide a rehabilitation method wherein the resin impregnated liner fitted with a bulkhead fitting at the pulling end is inflated with air using a resin impregnated inflation bladder. After inversion of the bladder, a port is formed through the bulkhead fitting and an integral air/steam exhaust pipe is attached so the bulkhead port and the resin is cured by flow-through steam. Alternatively, bulkhead fittings may be installed on a sleeve placed in a receiving access to install port on an inverted CIPP liner. This provides an installation method that is faster and more efficient economically than various rehabilitation methods currently practiced.

SUMMARY OF THE INVENTION

A method of porting the downstream end of an inflated cured in place liner without deflating the liner is provided. A bulkhead fitting is attached to the downstream end of a pull in liner prior to pull in or by securing a fitting at the end of an inflated pull in liner or an inflated inverted liner. A porting exhaust sleeve and valve assembly is attached to the bulkhead fitting and a hole is cut through the liner, and the inflation bladder in the case of a pull-in liner. The cutting device is removed without deflating the liner. The valve assembly is closed to permit attaching an exhaust hose to the exhaust sleeve assembly.

In the case of installation of cured in place liners by inversion, the bulkhead fitting may be installed after the liner is fully inverted. A bulkhead fitting with a lower air/steam barrier shield is installed by use of tension ratchet straps to pierce the walls of the inverted liner. Alternatively, an inverted cured in place liner may be inverted through a flexible or rigid catch sleeve previously fit with a bulkhead fitting and porting a hole in the liner.

In the case of pull in and inflation of cured in place liners, a bulkhead fitting is installed in the distal end prior to pull in. The liner may also be pulled through a catch sleeve previously fitted with a bulkhead fitting. In another embodiment, the pull-in liner and inflation bladder are simultaneously ported utilizing the bulkhead fitting with air/steam barrier shield and ratchet straps to pierce the cured in place layers.

In each case, once the liner is inflated and bulkhead fitting is in place, the inverting air remains isolated in the liner and/or inflation bladder. A closed valve assembly is attached to the bulkhead fitting with a closure fitting or external threads for attaching a cutting device. The valve is open to permit the cutting device to pierce the cured in place layers, then removed to allow the valve to be closed and the cutting device withdrawn from the bulkhead fitting assembly. Finally, an exhaust hose is attached, the valve opened so that control of exhaust is conveniently done at a remote location. It is a significant aspect of the invention to cure with flow through steam without deflating the liner. This avoids the potential that a loose section of existing pipe will be dislodged and randomly secured in place between the liner and host pipe on reinflation.

In another embodiment of the invention, the resin impregnated pull-in liner is provided with a second bulkhead fitting at the pull-in end for forming a port for a condensate drain.

Accordingly, it is the object of the invention to provide an improved method for rehabilitation of an existing pipeline by the installation of a cured in place liner with at least one bulkhead fitting at the distal end of the liner.

Another object of the invention is to provide an improved inflation bladder for use in the installation of cured in place liner with at least one bulkhead fitting for porting into an inflation bladder or inverted liner to allow for flow-through an exhaust hose installed on the bulkhead fitting.

A further object of the invention is to provide an improved method for pull in and inflate installation of a cured in place liner by utilizing flow-through steam to cure the resin.

Yet another object of the invention is to provide an improved method for installation of a cured in place liner by inversion and providing a bulkhead fitting for flow through of steam to cure Still another object of the invention is to provide an improved method of installation of a cured in place liner wherein air is used to inflate the liner and flow-through steam is used to cure the resin.

Still another object of the invention is to install an exhaust bulkhead fitting on an inflated liner by tightening a strap about the liner to pierce the liner layer and allow for flow-through without deflating the liner.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, references had to the following description taken in connection with the accompanying drawings in which:

FIGS. 7(a)-(g) are cross-sectioned schematic views of the procedure for forming an exhaust port at the distal end of the cured in place liner;

FIGS. 8(a) and (b) are cross-sectional schematic views of the steps for installing a condensate drain at the distal end of the inflation bladder after performing the steps shown in FIGS. 7(a)-(g);

FIGS. 14(a)-(g) illustrate the identical steps for porting an inverted cured in place liner with porting sleeve consistent with FIGS. 7(a)-(g).

DESCRIPTION OF THE PREFERRED EMBODIMENTS

Figure 1:
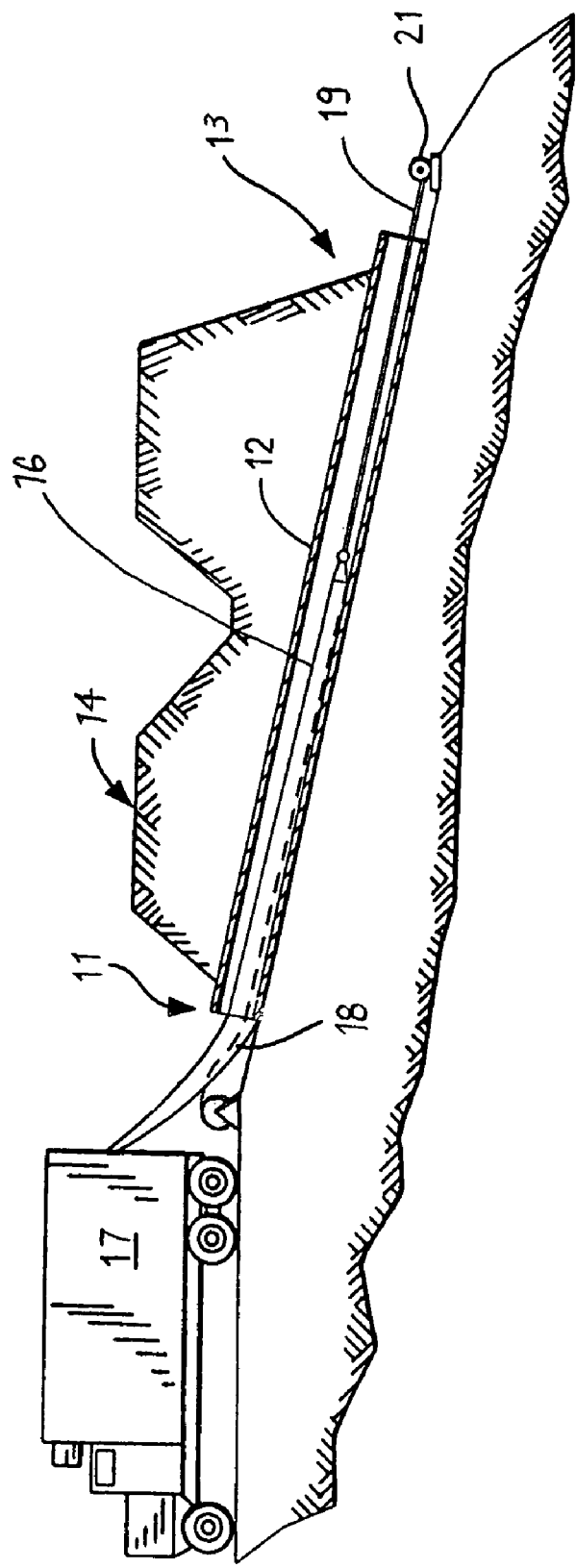
FIG. 1 is a cross-sectional elevational schematic views showing pulling in of a resin impregnated cured in place liner in a typical interstate highway culvert from an upstream or inversion end of the culvert to a downstream or distal end of the culvert at the start of the installation process to line the host pipe.

FIG. 1 shows an upper end 11 of a typical highway culvert crossing 12 passing under a roadway with a lower end 13. A resin impregnated liner 16 is pulled in from the upper end by a winch at the lower end. Liner 16 stored in a refrigerated vehicle 17 is wrapped with a polypropylene sleeve 18 to prevent damage and control longitudinal stretch during pull-in from upper end 11 to lower end 13 by a rope 19 pulled by a winch 21 at lower end 13.

Liner 16 is a flexible cured in place liner is of the type generally well known in the art. It is formed from at least one layer of a flexible resin impregnable material 22, such as a felt layer having an outer impermeable polymer film layer 23. Felt layers 22 and film layer 23 are stitched along a seam line to form a tubular liner. A compatible thermoplastic film in a form of a tape or extruded material is placed on or extruded over the seam line in order to ensure the impermeability of the liner.

Figure 2:
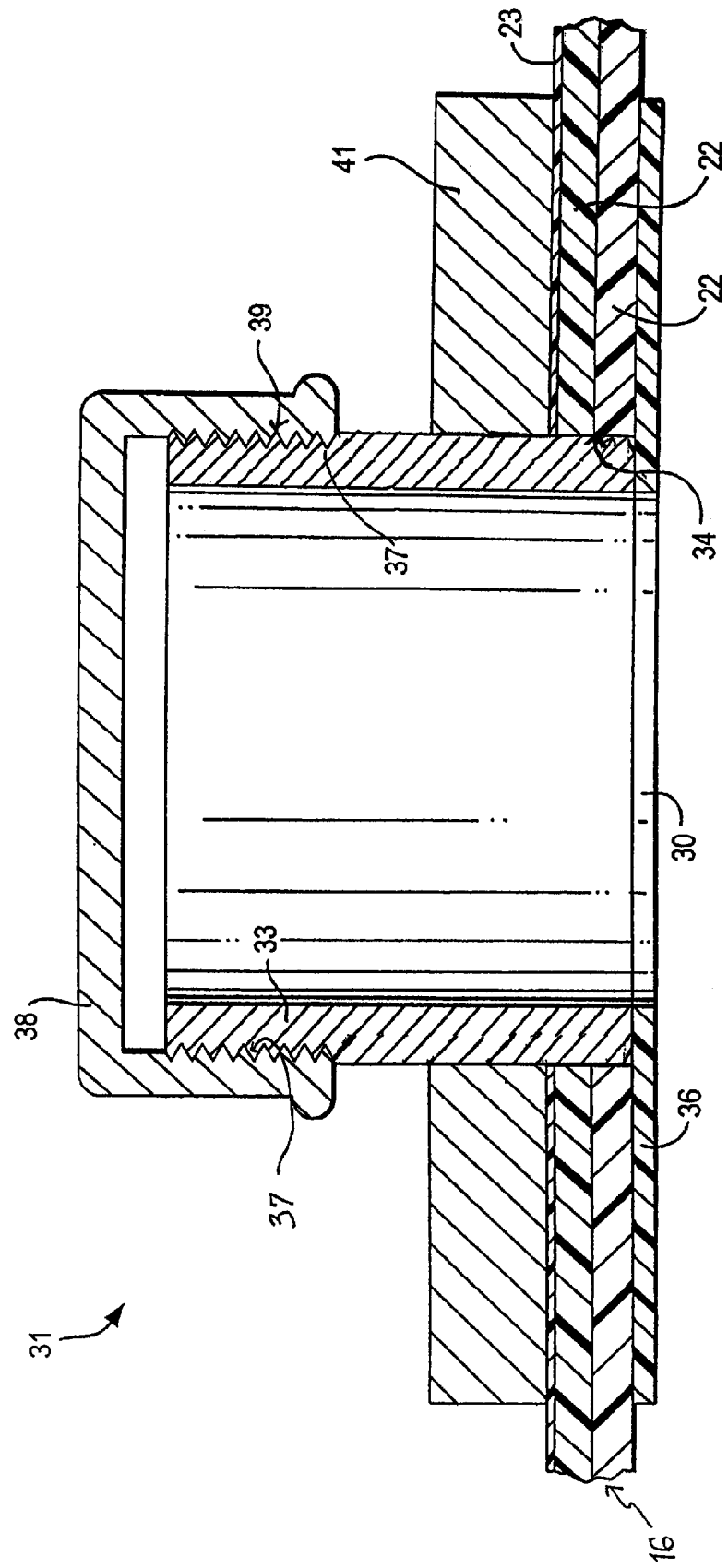
FIG. 2 is a cross-sectional view of a bulkhead fitting with cap installed at the pull-in end of a pulled in cured in place liner.

For larger liner diameters, several layers of felt material 22 may be used as illustrated in FIG. 2. Felt layers 22 may be natural or synthetic flexible resin absorbable materials, such as polyester or acrylic fibers. Impermeable film layer 23 may be a polyolefin, such as polyethylene or polypropylene, a vinyl polymer, such as polyvinyl chloride, or a polyurethane as is well known in the art. In the initial step in all trenchless rehabilitation installations, existing pipeline or conduit 12 is prepared by cleaning and videotaping.

Figure 4:
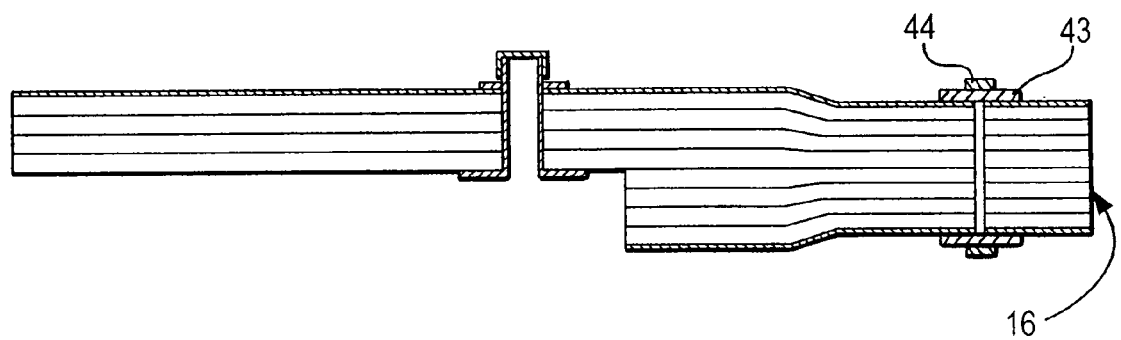
FIG. 4 is cross-sectional view of the liner of FIG. 3.
Figure 5:
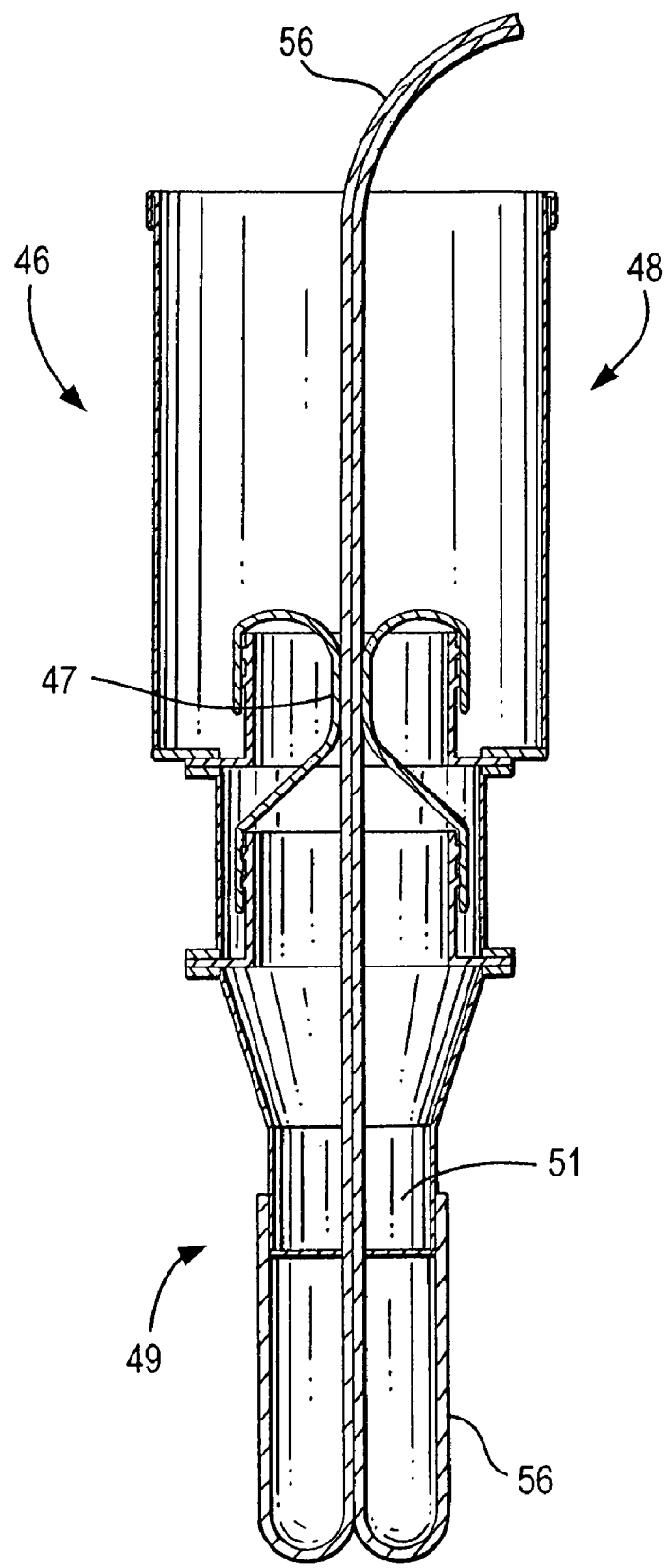
FIG. 5 is a cross-sectional schematic view of a pressurized inversion unit for the air inversion of an inflation bladder into the pulled in liner in accordance with one aspect of the invention.

A bulkhead fitting 31 as shown in FIG. 2 is installed in the pull-in end of resin impregnated liner 16 as shown in cross-section in FIG. 2 and in the lay flat condition in FIG. 4. Bulkhead fitting 31 is a rigid bushing 32 having a sleeve 33 to pass though a hole or opening 34 in liner 16 with an internal flange 36 that sits on the inside of felt layers 22. The outside of sleeve 33 has an external closure fitting such as an external thread 37 for receiving a cap 38 with a corresponding internal thread 39. Alternatively, a Chicago fitting may be used for attaching a valve assembly. A locking washer or compression nut 41 having an internal thread 42 is place on sleeve 33 to secure bulkhead fitting 31 securely in place on liner 16.

Bulkhead fitting 31 is fabricated from steel, polypropylene, or other rigid plastic material of sufficient strength and temperature rating to withstand the steam temperatures during cure.

Figure 3:
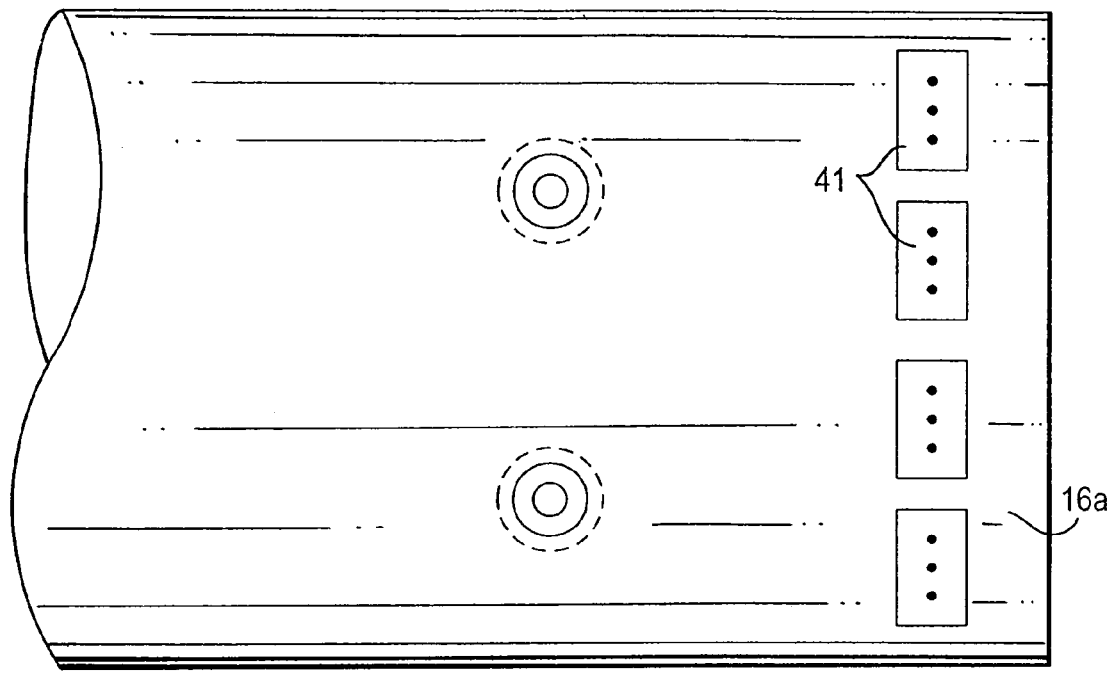
FIG. 3 is a plan view of the pull-in end of the liner of FIG with two installed bulkhead fittings.

As shown in FIGS. 3 and 4 a plurality of pull-in/restraining plates 43 are secured at a pull-in end 16a of liner 16. Plates 41 are steel or other rigid plastic material and are placed on the top and bottom of lay flat liner 16 and secured by a plurality of bolts 44 through lay flat liner 16. Bulkhead fitting 31 is shown installed on top half of liner 16 in FIG. 4. Two bulkhead fittings 31 are installed in line 16 as shown in FIG. 3 for coupling a steam exhaust and a condensate drain.

Prior to commencing installation pursuant to the method in accordance with the invention, a curable thermosetting resin is impregnated into layers felt 22 of liner 16 by a process referred to as "wet-out." The wet-out process generally involves injecting resin into the felt layer through the end or an opening formed in the impermeable film layer, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin that is relatively stable at room temperature, but which cures readily when heated.

Impregnated liner 16 is placed about 20 feet from the entrance to the inversion end 11 of host pipe. A rope is threaded from upper end 11 to lower end 13. The rope is then attached to pull-in winch cable 19 that is pulled to the upper end.

Sleeve 18 is polypropylene or other suitable plastic film that is placed under and wrapped about pull-in liner 16 as it enters host pipe 12. Sleeve 18 may be folded over liner 16 and banded or taped to protect liner 16 as it is pulled into host pipe 12 by winch. Pull in is continued until the trailing end of liner 16 is a desired distance from lower end 13 of host pipe 12. This is based on site conditions.

An inversion unit 46 having a sphincter valve 47 of the type shown in U.S. Pat. No. 5,154,936 is positioned at the trailing end of pull-in liner 16. Everson unit includes an inlet end 48 and an outlet end 49 with an inversion boot 51 to fit the diameter of liner 16. Air is used to operate sphincter valve 49 and inversion boot 51 is adapted to receive air for inversion of an inflation bladder 56. Steam for curing is provided through a stainless hose 91 from a boiler 92 to a perforated lay flat hose 93 pulled in with inflation bladder 56.

Inflation bladder 56 is a resin impregnated tube of at least one layer of a resin impregnable material as used in liner 16 and has an outer impermeable layer. After layer 16 is installed in conduit 12, inflation bladder is folded and pulled through inversion unit 46 until sufficiently passed the face of banding boot 51. The bladder is then folded over the boot and securely banded. Pulled in liner 16 is then banded to banding boot 51 over banded inflation bladder 56. Inversion air hoses for operation of the inversion unit bladder and the inversion of the inflation bladder are connected to inversion unit 46.

Figures 10A, 10B:
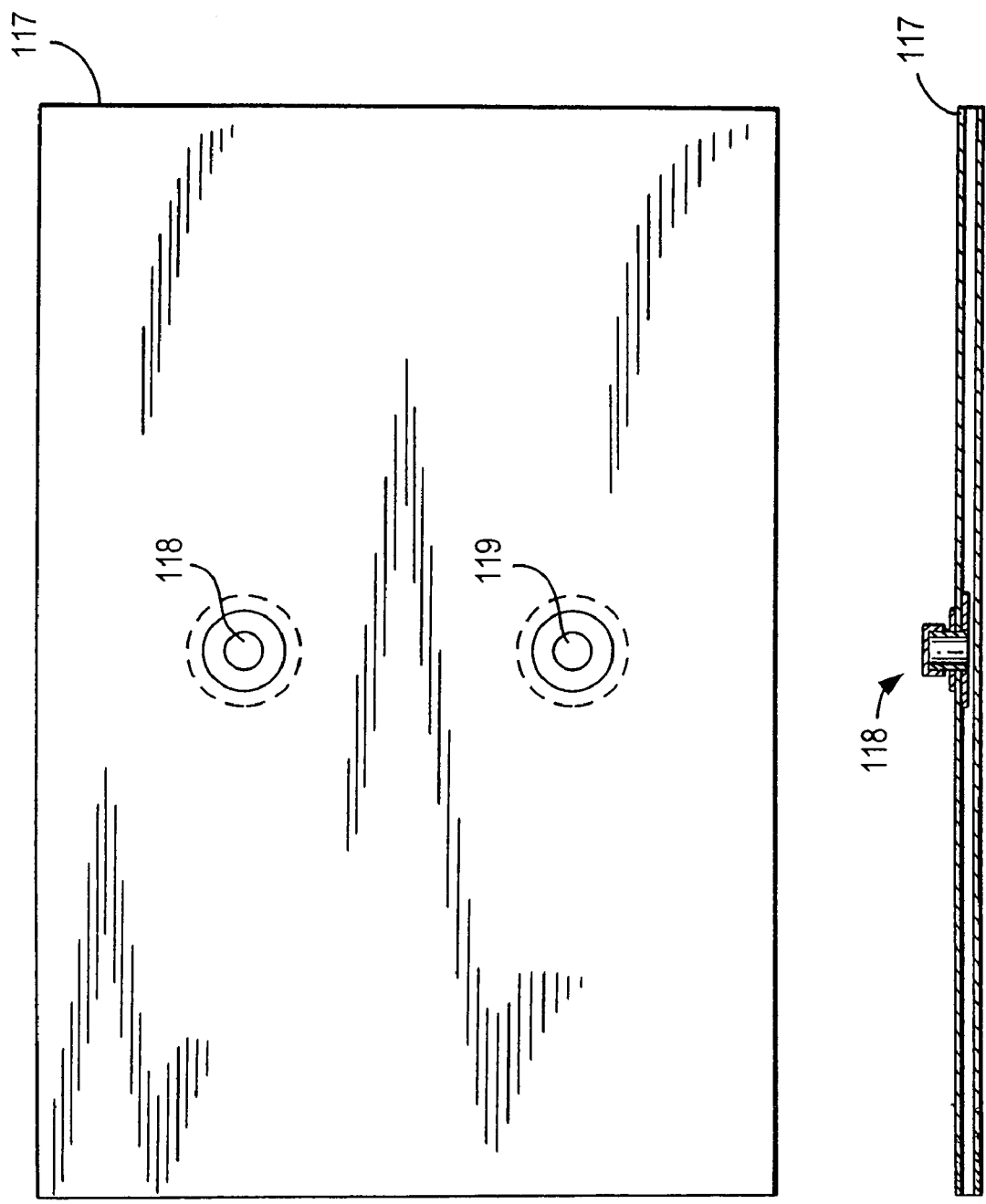
FIGS. 10(a) and 10(b) an a schematic plan view and cross-sectional of a porting sleeve for use with an inverted lining tube.
Figure 11:
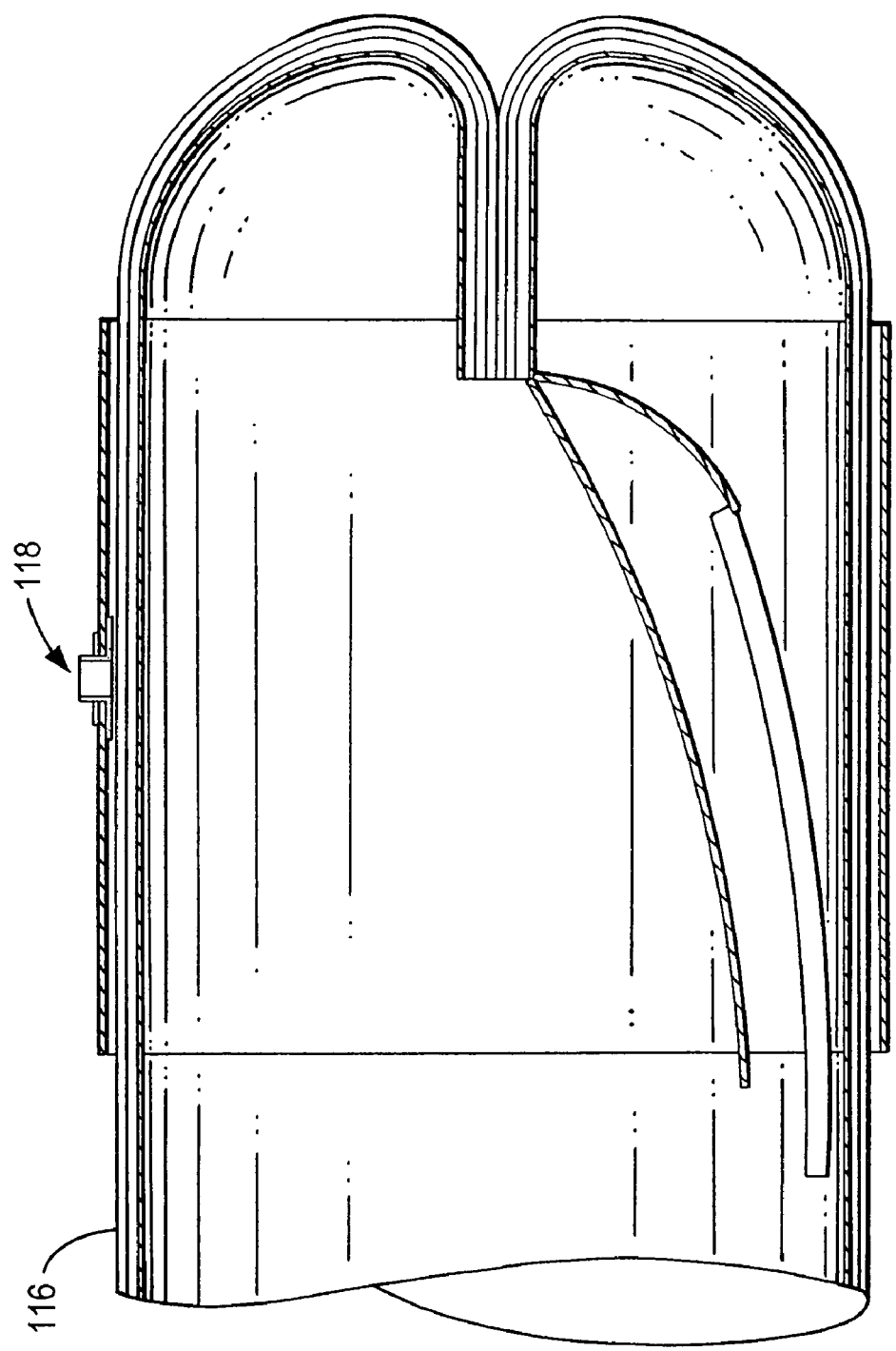
FIG. 11 is a schematic in cross-section of the porting sleeve of FIG. 10 with the inverted end of a fully inverted lining tube.
Figure 12A:
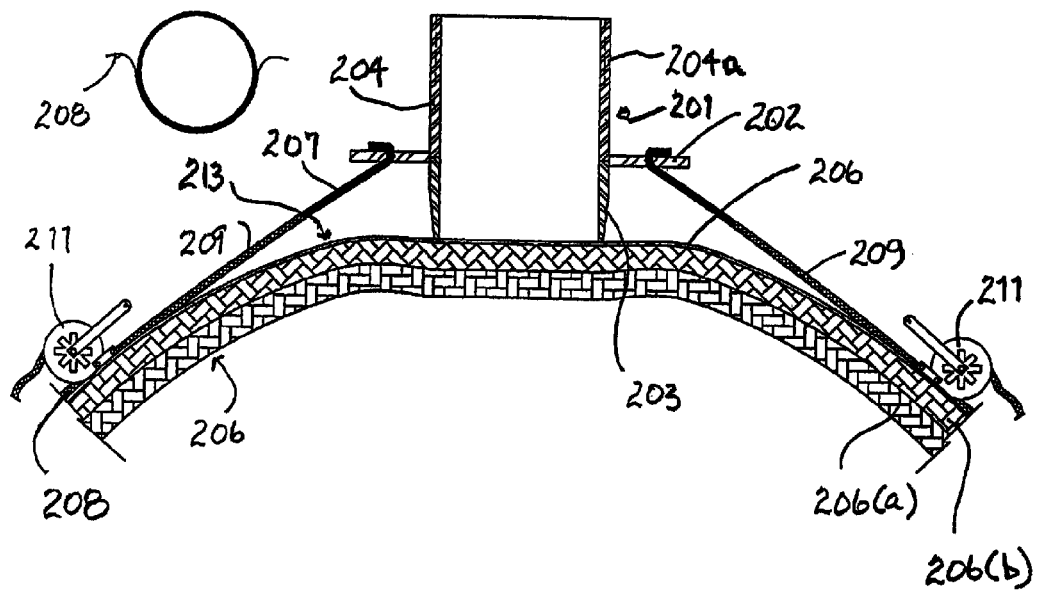
FIGS. 12(a)-(d) are cross-sectional schematic views of the steps for installing a bulkhead fitting in an air inverted cured in place liner utilizing a fitting with air/steam barrier shield with ratchet straps.
Figure 12B:
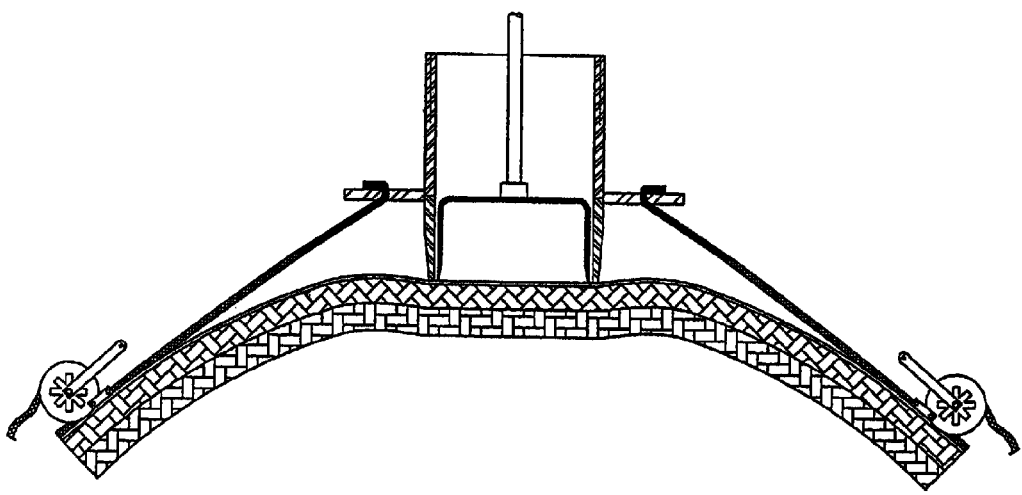
Figure 12C:
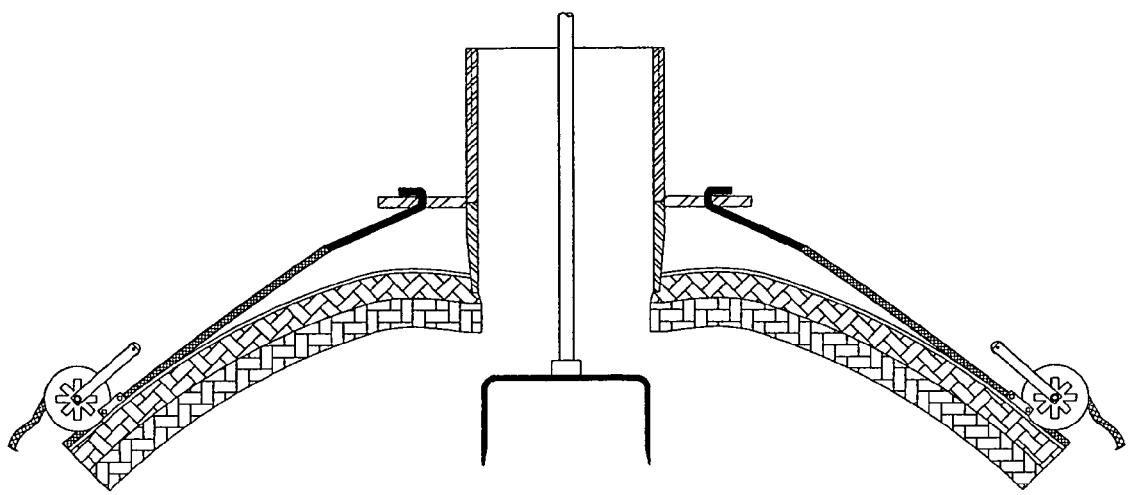
Figure 12D:
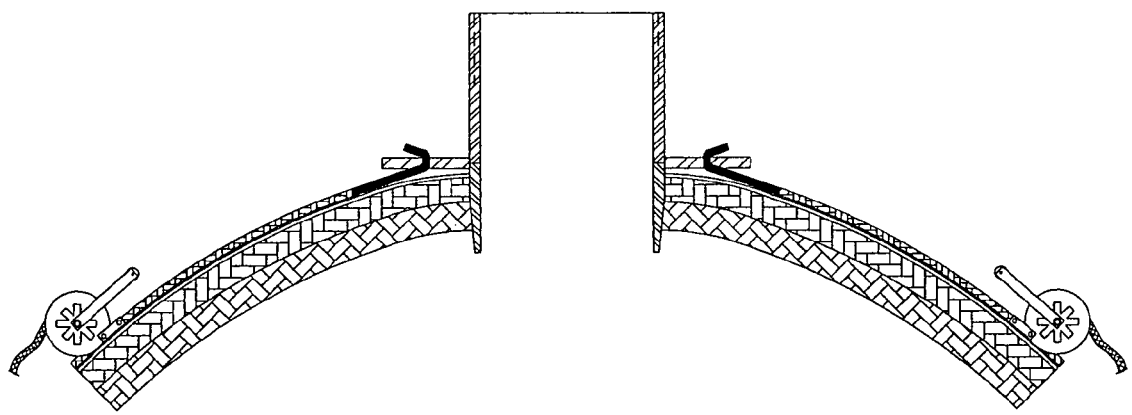
Figure 13A:
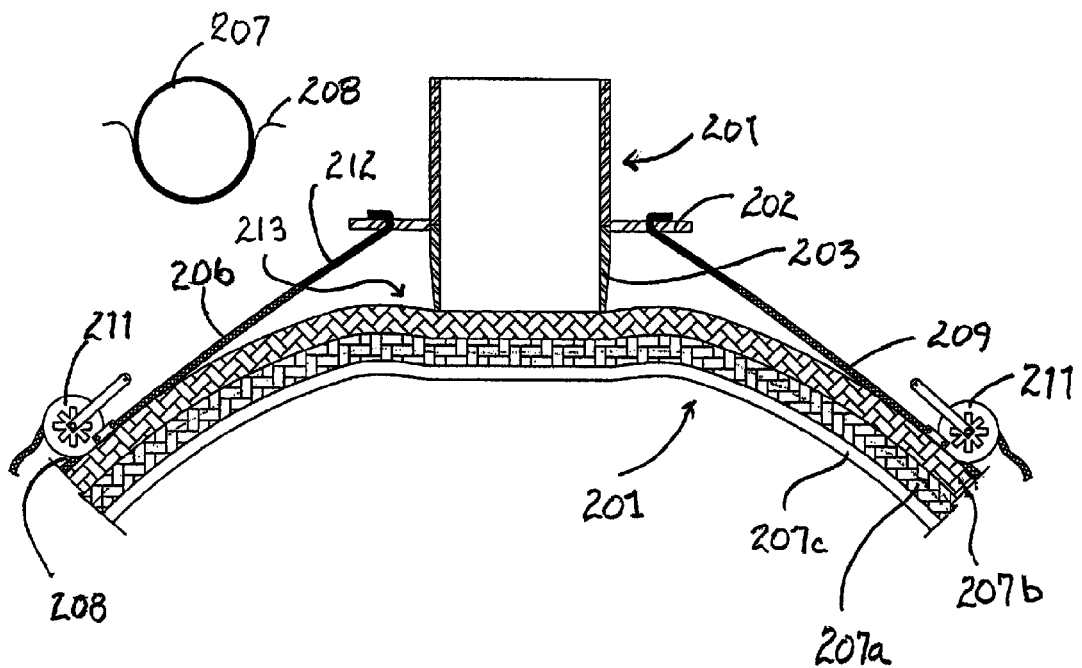
FIGS. 13(a)-(d) are cross-sectional schematic views of the procedure for forming the exhaust support in a pulling tube expanded with an inflation bladder utilizing ratchet straps consistent with FIGS. 12(a)-(d)
Figure 13B:
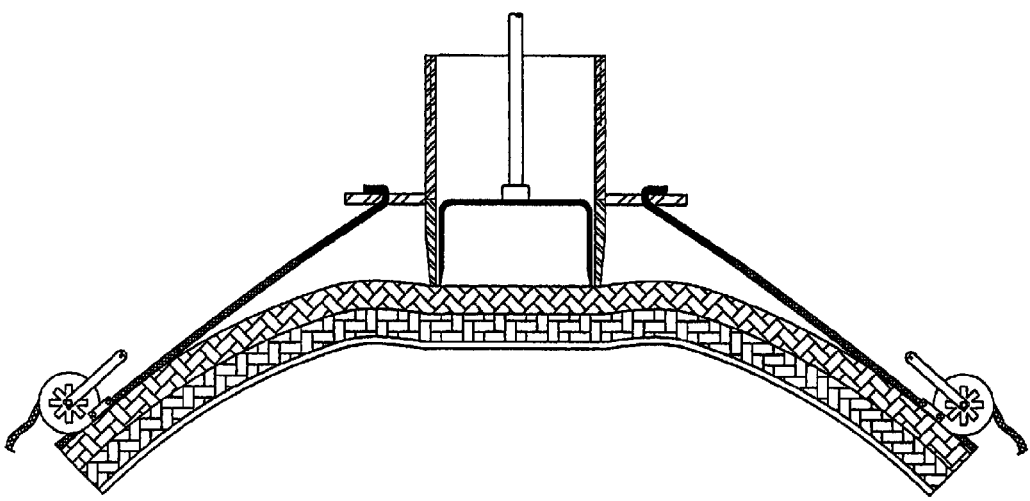
Figure 13C:
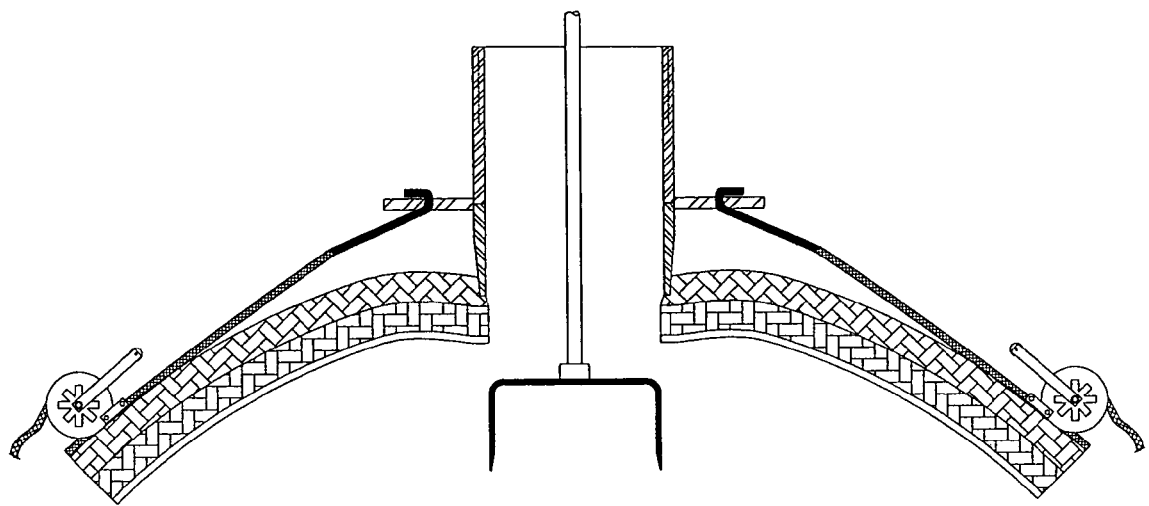
Figure 13D:
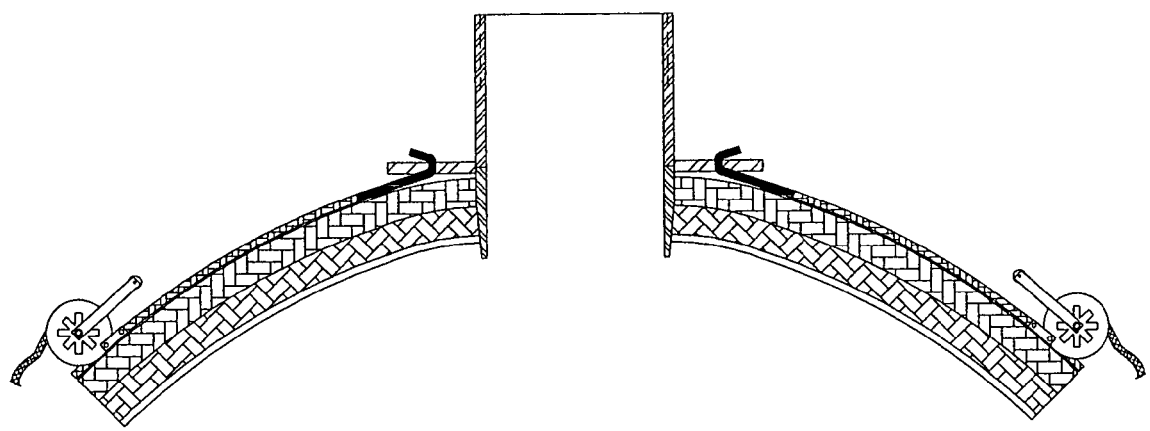
Figure 14E:
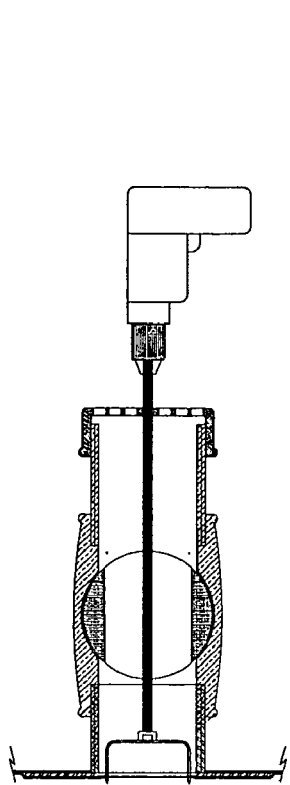
Figure 14F:
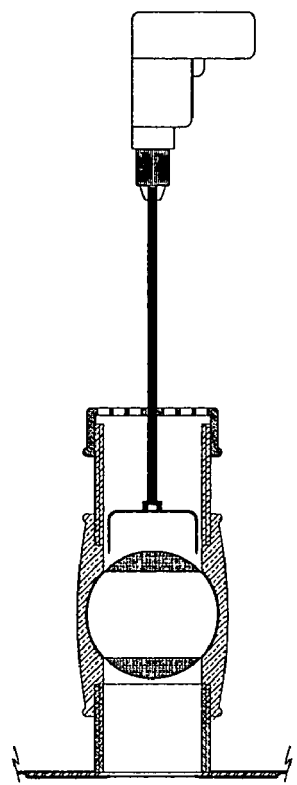
Figure 14G:
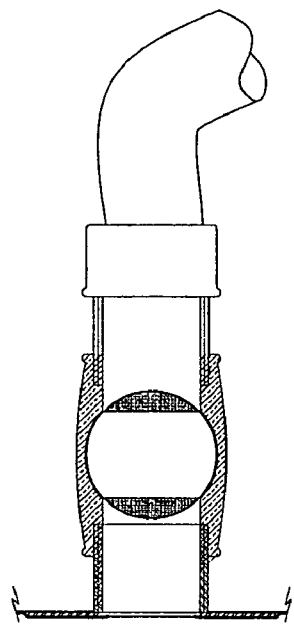

In accordance with another embodiment of invention, a liner 116 is installed in existing conduit by the inversion method as described U.S. Pat. No. 4,064,211. In order to provide a flow-through port in the inverted end of liner 116 a porting sleeve 117 for an inverted liner as shown in FIGS. 10(a) and (b) is provided. Sleeve 117 may be rigid or preferably it is flexible so as to fit into a receiving manhole.

Sleeve 117 included an exhaust bulkhead fitting 118 and a condensate drain bulkhead 119. Bulkheads 118 and 119 are identical with those provided on pull-in liner 16 as illustrated in FIG. 2 and described in detail above. FIG. 2(a) shows one fitting in cross-section.

Sleeve 117 is placed at the receiving end of the existing conduit and liner 116 is inverted through sleeve 117 and restrained. At this time ports 118 and 119 are formed using the procedure outlined in connection with FIGS. 7 and 8.

FIGS. 12 and 13 illustrate the attachment of a bulkhead fitting 201 to a cured in place liner. Bulkhead fitting 201 has a tubular portion 204 with an external thread 204a and a slotted flange 202 and a tapered air/steam barrier 203 projecting downward to an inflated cured in place liner. The liner may be pull-in and inflate liner 206 as illustrated in FIGS. 12(a)-(d), or be a inverted liner 207 as illustrated in FIGS. 13 (a)-(d). In both cases, bulkhead fitting 201 is installed into the inflated liner utilizing a webbing or strap 208 that passes underneath the liner and is joined to bulkhead fitting 201 by a ratchet strap 209 on each side of fitting 20.

Turning specifically to FIG. 12, a pull-in and inflate cured in place liner 206 is shown in cross-section with bulkhead fitting 201 positioned at the top thereof. Liner 206 includes an inner resin impregnated layer 206a and an outer impregnated layer 206b with an impermeable inner layer 206c. A protective sheet 211 is wrapped about liner 206 to cover exposed resin in resin impregnated layer 206. Webbing 208 is positioned below fully inverted and inflated liner 206. The ends of webbing 208 includes are inserted into a pair of ratchets 211. A pair of ratchet straps 206 having a ratchet strap hook 212 is inserted into slotted flange 202 on bulkhead fitting 201.

Bulkhead fitting 202 includes external threaded end 204 for receipt of a screw cap 38 as shown in FIG. 2. With screw cap 38 in place, ratchets 211 are tightened to create a depression 213 in liner 201. A hole saw or assembly 212 similar to that utilized in connection with FIGS. 7(a)-(g) is inserted into position within bulkhead fitting 201. A drill hole 217 is formed in liner 206 with air/steam barrier shield 203 entering the interior of liner 206. At this point ratchet straps 209 are fully tightened to position bulkhead fitting 201 so that it is ready for receipt of steam consistent with the procedure as described in connection with FIGS. 7(a)-(g). This is shown in the steps illustrated in detail in FIGS. 14(a)-(g).

Referring now to FIG. 13, a pulled in an inverted cured in place liner 207 with and a fully inverted inflation tube 251 is shown in cross-section with bulkhead fitting 201 positioned at the top thereof. Liner 207 includes an inner resin impregnated layer 207a and an outer impregnated layer 207b with an impermeable outer coating 207c. Webbing 208 is positioned below fully inverted and inflated liner 212. The ends of webbing 208 includes are inserted into a pair of ratchets 211. A pair of ratchet straps 209, each having a ratchet strap hook 212 is inserted into slotted flange 202 on bulkhead fitting 201.

Bulkhead fitting 201 includes external threaded end 204 for receipt of a screw cap 38 as shown in FIG. 2. With screw cap 38 in place, ratchets 211 are tightened to create a depression 213 in liner 207. A hole saw or assembly 212 similar to that utilized in connection with FIGS. 7(a)-(g) is inserted into position within bulkhead fitting 201. A drill hole 217 is formed in liner 207 with air/steam barrier shield 203 entering the interior of liner 207. At this point ratchet straps 209 are fully tightened to position bulkhead fitting 201 so that it is ready for receipt of steam consistent with the procedure as described in connection with FIGS. 7(a)-(g).

In the conventional pull in and inflate installation process utilizing a water inversion process, pressure within the bladder and liner is maintained due to the height of the water column within the downtube. Cure is initiated by exposing the impregnated liner to heat. This is usually accomplished by introducing heated water into the inversion pipe or by circulating hot water through a recirculation hose pulled into the inverting bladder by a length of rope connected to the trailing end of the inverting bladder. Generally, cure takes between about 3 to 5 hours depending on the type of resin selected and the thickness of the liner. After cure, entry into the downstream manhole is necessary to release the heated water after cure prior to removal of the inflation bladder.

For a medium and large diameter liners this presents significant problems, especially when relining a typical highway culvert having a significant incline as shown in FIG. 1. Not only is a large volume of water required, but the added pressure from the vertical drop would rupture an inflation bladder. To avoid this the use of air to inflate and steam to cure is desirable. In addition the energy earned by the steam will cure the line faster and at a lower energy cost.

For example, the following TABLE I shows a comparison of energy and water requirements for water versus steam cure of 114 feet of a 42 inch diameter cured in place pipe with a 9.5 foot downtube and 3.5 feet at downstream.

TABLE I

Comparison of Energy & Water requirements for Steam Cure and Water Cure for CIPP. 114.1 feet of 42" diameter CMP (101 CMP + 9.6 ft downtube + 3.5 downstream end Ground temperature 60 degrees F. no ground water

| Water inversion and Cure | | Air Inversion and Steam Cure | |
|---|---|---|---|
| | | 108 ft × 39.67#/ft Resin | 4284 |
| Water in lbs. | 68,501 | Steam required in lbs. @ 1.5 lbs resin per lb. of steam | 2856 |
| | | Estimate Gallon of water | 342 |
| Water in gallons | 8,208 | Actual Gallon used | 225 |
| Water Temp. | 55 | Actual lbs. of Steam used | 1878 |
| Cure Temp | 180 | | |
| Temp Diff. | 125 | | |
| BTUs Required to Heat up water | 8,562,631 | | |
| Heat up time with 5 million BTU boilers in hours | 2.4 | | |
| Cure Time: one boiler @ 3.5 million intermittant firing (20% of the time) in hours | 2.5 | | |
| BTU required to Cure | 1,750,000 | | |
| Estimated Total BTUs | 10,312,631 | BTU used for Steam Cure | 1,821,362 |
| Total Heat-up & Cure | 5 Hours* | Total Heat-up & Cure | 3 Hours* |

1. The Air Invert Steam cure used 2.7% of the water used for water inversion; 225 gallon vs. 8,208 gallons. (Note this does not include water added for cool down in most water inversions)
2. The Air Invert Steam Cure used 17.7% of the energy used for hot water cure (1,821,362 BTUs for Steam cue vs. 10,312,631 BTUs for hot water cure).
3. Heat-up and Cure cycle for Steam Cure was 60% of Hot Water Cure.

FIG. 3 illustrates the position of the bulkhead fittings and restraining plates for attaching a pull-in rope for pulling in the liner.

A typical inversion apparatus of the type disclosed in U.S. Pat. No. 5,154,536, the contents of which are incorporated herein by reference to be used in accordance with a preferred embodiment of the invention. The inversion apparatus may be mounted horizontally at the upstream end of the host pipe. After banding inflation bladder 56 and liner 16 are banded at inversion end 51. Valve 47 is pressurized and bladder 56 is inverted into liner 16. Air pressure is applied to the air inlet sufficient to effect the inversion. Lubricant is applied to the surface of bladder 56 as it is fed in to facilitate movement through gland on valve 47 during inversion of bladder 56.

Inflation bladder 16 may include an air release vent formed about 2 to 4 feet from the end of the bladder. This will allow air in the bladder to be expelled before passing through a valve in an inversion apparatus as the bladder is being inverted. The vent is formed by cutting a ½ inch hole in the top layer of the bladder and covering it with two opposed patches as shown.

The inversion air supply and bladder pressure is adjusted to maintain a uniform inversion rate. The recommended pressures are:

|  | Dia | | | |
| --- | --- | --- | --- | --- |
|  | 36" | 42" | 48" | 54" |
| Psig | 4.0 | 3.5 | 3.0 | 2.5 |

Figure 6:
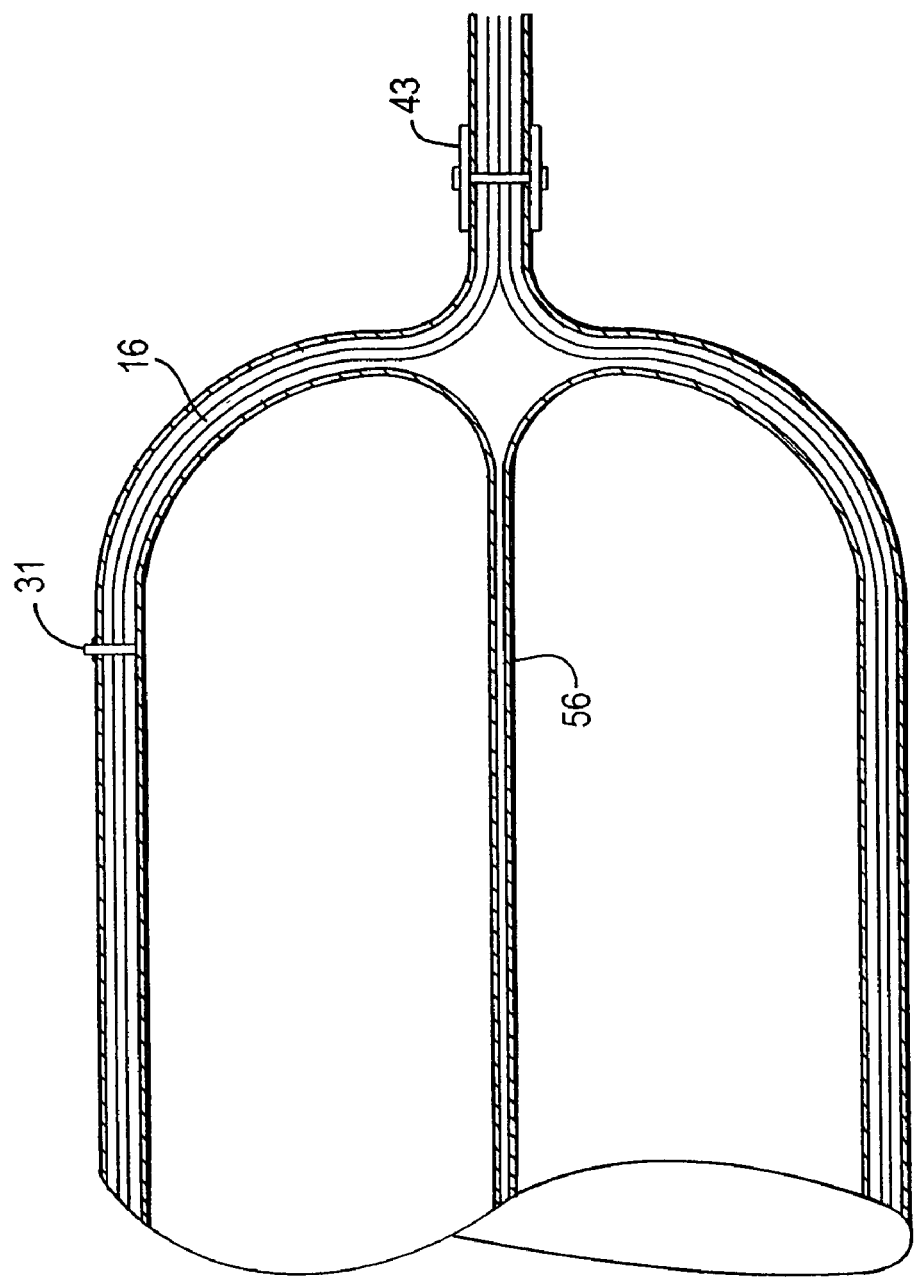
FIG. 6 is a cross-section schematic of the inverting face of the inflation bladder at the distal end of the pulled in liner with bulkhead fitting during an installation in accordance with the invention.

When the inversion continues and inflation bladder 56 approaches lower opening 13, the inverting end is stopped by pull-in/restraining plates 41 shown in FIGS. 3 and 4. This is illustrated in FIG. 6. The air pressure in inflation bladder 56 is maintained when the inversion is stopped. At this time, port 30 is formed in inflation bladder 56 following the steps shown in FIGS. 7(a)-(g) as follows to install a valved exhaust pipe 61 is installed as shown in FIG. 7(g). Resin impregnated pull-in liner 16 is provided with a second bulkhead fitting 31 at pull-in end 16a for forming a second port 63 for a condensate drain 64 as shown in FIGS. 8(a) and (b).

After inflation tube 56 is fully inverted cap 38 is removed and a valve and hole cutting assembly 70 including a ball valve 71 is installed on fitting sleeve 39. Ball valve 71 is closed. A nipple 72 is installed on ball valve 71. A hole saw 73 with a drill stem 74 is inserted in nipple 72 and a hole saw stem guide 76 is secured to the end of nipple 72. A drill 73 is attached to stem 74.

Ball valve 71 is opened on port 30 or 63 and drill 77 is started to cut a hole 30 or 63 while maintaining air pressure in bladder 56. When port 30 or 63 are fully cut, ball valve 71 is closed and drill 77 and hole saw 73 are removed from fitting 31. Exhaust hose 61 is then attached to nipple 72.

Referring now to FIGS. 8(a) and (b) condensate port 63 is formed following the same steps as illustrated in FIGS. 7(a) to 7(f). After removal of drill 77 a condensate pipe gland 81 is placed on nipple 72 and a condensate drain hose 82 is place in gland 82 to reach the bottom of bladder 56. Gland 82 is tightened to prevent movement of hose 82.

Figure 9A:
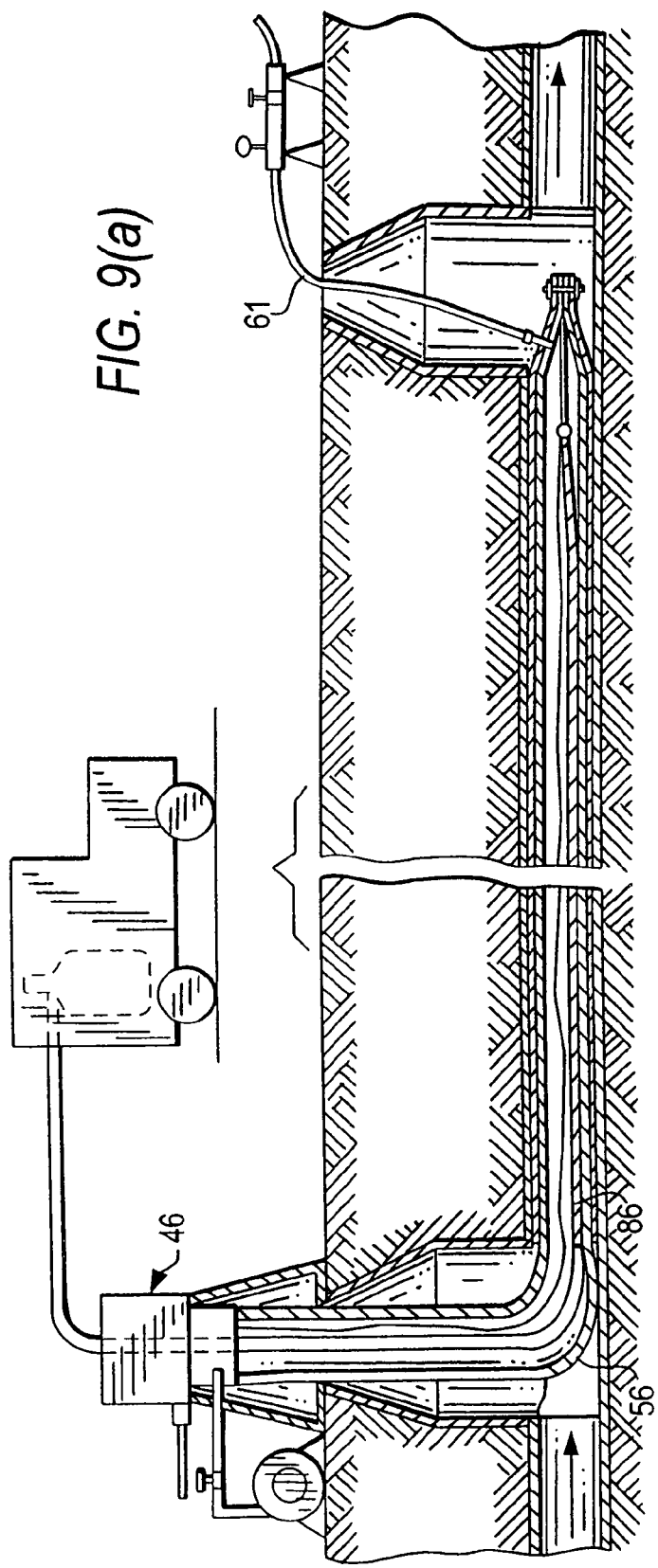
FIG. 9(a) is a schematic in elevation showing the cure step of the installation of a resin impregnated liner with an exhaust hose coupled to the ported bulkhead fitting of FIG. 7(g) in accordance with the invention.
Figure 9B:
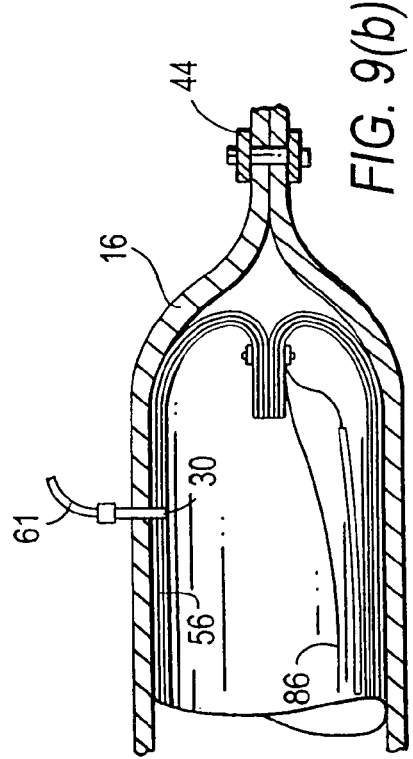
FIG. 9(b) is an cross-sectional view of the receiving end of the liner of FIG. 9(a)

Now referring to FIG. 9, steam is introduced into attached perforated lay flat hose 86 to initiate cure of the resin in pull-in liner 16 and inflation bladder 56. In an exemplary embodiment of the invention, lay flat hose 86 is a high temperature thermoplastic tube 4 inches in diameter. For example, one-eighth inch orifices. The size and spacing may vary depending on the boiler and liner size and length are drilled at one foot intervals at one-half inch from the folded edges at opposite edges. This orifice pattern provides more steam at the proximal end of liner 16 and ensures good mixing even if hose 86 becomes twisted. This also insures that steam is injected into any condensate that forms in the pipe invert to cure that portion of the resin in the liner covered by the condensate pool. Steam is provided from a steam inlet hose that is regulated by a valve manifold to provide an air/steam mixture to the inlet line for providing steam. The air/steam flow is adjusted to maintain a curing pressure of about 3-6 psi until the combined air/steam flow temperatures reach a desired temperature of about 170-220° F. measured at the exhaust tube.

The recommended warm up and cure pressures in psig are as follows:

|  | Tube DR | | | | |
| --- | --- | --- | --- | --- | --- |
|  | 50 | 60 | 70 | 80 | 90 |
| Warm-up Psig | 6.0 | 5.0 | 4.2 | 3.7 | 3.3 |
| Cure Psig | 6.0 | 5.0 | 4.2 | 3.7 | 3.3 |

Depending upon the particular resin and tube thickness, once the cure is complete, steam flow is turned off while simultaneously adjusting the air flow to maintain cure pressured. The exhaust valve is adjusted while cooling to about 130° F. at the six o'clock position for at least interfacing between the liner 16 and the existing pipe 12.

Once the temperature has cooled to the desired level, air flow pressure is reduced to zero; the exhaust valve is fully opened. Any condensate that may have accumulated in the bladder is removed by condensate drain on the exhaust assembly.

It can readily be seen that the process in accordance with the invention readily allows one to attain the advantage of air inflation and curing a resin liner with flow through steam suitable for both pull in and inflated and an inverted liner. By practicing the process, a tubular member can be easily inverted through an existing pipeline. By providing a built in bulkhead fitting for forming a selectively openable exhaust valve, pressure can be maintained within the inverted liner or bladder and inflated pull in liner and steam can be introduced at the inversion access without deflating the inflated liners and flow through the curing liner. This utilizes the higher energy available in the steam to cure the resin significantly faster than one can cure utilizing circulating hot water.

It will thus be seen that the objects set fort above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method for trenchless rehabilitation of an existing pipeline from a first access point to a second access point by inserting a flexible resin impregnated liner from the first access point to the second access point and inflating the liner to conform the liner to the existing pipeline and curing the resin in the liner, comprising:

providing a selectively sealable bulkhead fitting with a cap closing the bulkhead fitting mounted to a catch sleeve with an opening through the catch sleeve;

placing the catch sleeve and closed bulkhead fitting at the second access point;

installing the resin impregnated liner in the existing pipeline from the first access point to the second access point and through the catch sleeve at the second access point;

inflating the liner to sealingly engage the catch sleeve about the liner and urging the bulkhead fitting against the inflated liner without deflating the liner;

removing the cap and installing a porting valve and exhaust assembly with a gland for receiving a hole saw shaft on to the bulkhead fitting while maintaining pressure in the interior of the liner;

forming an opening in the liner with the hole saw without allowing the liner to deflate;

closing the valve and removing the hole saw;

installing an exhaust hose on the ported bulkhead exhaust assembly;

introducing steam into the interior of the liner;

opening the valve to allow the steam to flow through the liner and exit through the exhaust hose; and allowing the resin in the liner to cure.

2. The method of claim 1, wherein the liner is installed in the existing pipeline by pulling the liner into the existing pipeline and through the catch sleeve, and the liner is inflated with an inverting inflation bladder.

3. A method for trenchless rehabilitation of an existing pipeline from a first access point to a second access point by inserting a flexible resin impregnated tubular liner from the first access point to the second access point and conforming the liner to the existing pipeline and curing the resin in the liner, comprising:

providing a bulkhead fitting mounted on a catch sleeve at the second access point;

inserting the liner from the first access point through the catch sleeve at the second access point so the liner extends into an inlet opening of the catch sleeve and out of an outlet opening of the catch sleeve;

inflating the liner to press against the catch sleeve;

opening the bulkhead fitting and forming an opening in the liner while maintaining pressure in an interior of the liner;

forming a port through the bulkhead fitting through an opening in the catch sleeve which is different from the inlet and outlet openings without allowing the liner to deflate;

installing an exhaust hose on the ported bulkhead fitting;

introducing steam into the interior of the liner and allowing the steam to flow through the liner and exit through the exhaust hose; and allowing the resin in the liner to cure.

4. The method of claim 3, wherein the liner is installed in the existing pipeline by pulling the liner into the existing pipeline and through the catch sleeve, and the liner is inflated with an inverting inflation bladder.

5. The method of claim 3, wherein the liner is installed in the catch sleeve at the second access point by inverting the liner through the catch sleeve.

6. The method of claim 1, wherein the liner is installed in the catch sleeve at the second access point by inverting the liner through the catch sleeve.

7. The method of claim 1, wherein the liner is inflated with air.

8. The method of claim 5, wherein the liner is inflated with air.

9. The method of claim 6, wherein the liner is inflated with air.

* * * * *